Figure 1:
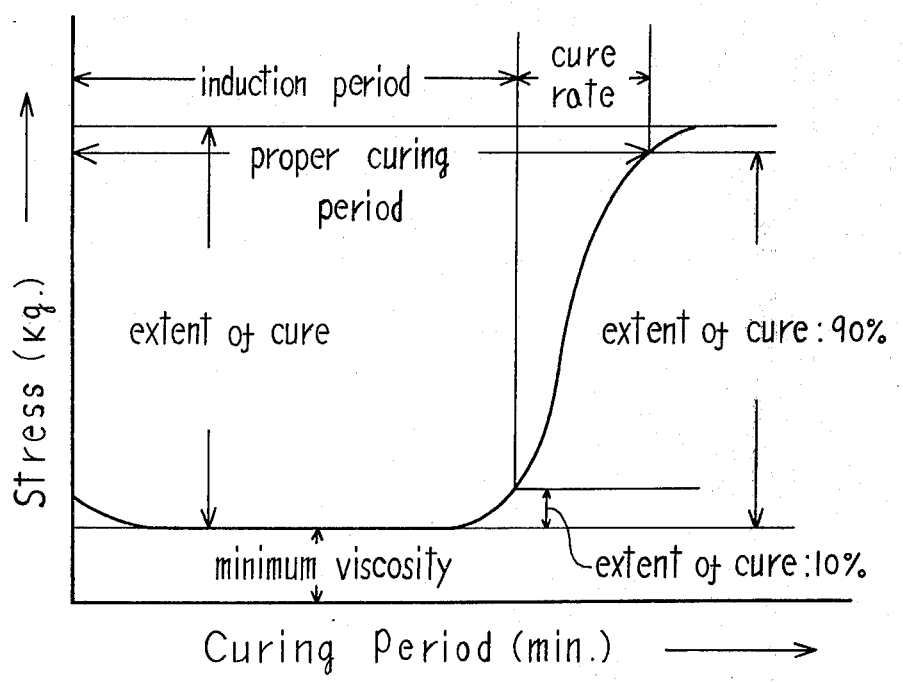

United States Patent [19]
Kometani et al.

[11] 3,951,913
[45] Apr. 20, 1976

[54] FLUOROELASTOMER COMPOSITION

[75] Inventors: Yutaka Kometani; Shun Koizumi, both of Toyonaka; Takeshi Suzuki, Nagaokakyo; Yasuyoshi Furukawa, Neyagawa; Masayasu Tomoda, Takatsuki; Kiyoichi Kondo, Settsu, all of Japan

[73] Assignee: Daikin Kogyo Co., Ltd., Osaka, Japan

[22] Filed: Apr. 19, 1974

[21] Appl. No.: 462,427

[30] Foreign Application Priority Data
Apr. 21, 1973 Japan.............................. 48-45247

[52] U.S. Cl. ........................ 260/47 UA; 260/29.6 F; 260/42.27; 526/17; 526/42; 526/44; 526/49; 526/89; 526/217; 526/221; 526/242; 526/247; 526/249; 526/250
[51] Int. Cl.² .......................................... C08F 8/30
[58] Field of Search............ 260/87.7, 80.77, 80.76, 260/47 UA; 450/620

[56] References Cited
UNITED STATES PATENTS
3,674,763   7/1972   Nakamura et al. ................. 260/87.7

*Primary Examiner*—Stanford M. Levin
*Attorney, Agent, or Firm*—Stevens, Davis, Miller & Mosher

[57] ABSTRACT

A fluoroelastomer composition which contains (a) a fluoroelastomer, (b) at least one metal compound selected from the group consisting of bivalent metal oxide, bivalent metal hydroxide and mixture of bivalent metal oxide or metal hydroxide with metal salt of weak acid, (c) an aromatic polyhydroxy compound, (d) a quaternary ammonium compound of 8-alkyl- or 8-aralkyl-1,8-diaza-bicyclo[5.4.0]-7-undecenium, and (e) 1,8-diaza-bicyclo[5.4.0]-7-undecene in an amount of not more than 0.07 part by weight per 100 parts by weight of fluoroelaster, provides a fluoro-rubber having a low compression set and an excellent elastic property. The fluoroelastomer composition can be handled and processed with safety, and yet can be cured with an appropriate induction time and a good cure rate, and has excellent storage properties.

13 Claims, 1 Drawing Figure

FLUOROELASTOMER COMPOSITION

BACKGROUND OF THE INVENTION

The present invention relates to a novel fluoroelastomer composition, and more particularly to a fluoroelastomer composition having an appropriate induction time in cure and a satisfactory good cure rate, which is suitable for preparing a fluoro-rubber having a low compression set an an excellent elastic property.

The term "fluoroelastomer" used herein means a highly fluorinated elastic copolymer and the term "fluoro-rubber" used herein means an article obtained by curing the fluoroelastomer composition.

A fluoro-rubber has excellent heat resistance, oil resistance, chemical resistance and weathering resistance and is useful for gaskets, sealants, diaphragms, pipes and so on, and the demand thereof is increasing in various fields such as automobile industry, oil pressure industry, general mechanical idustry, aircraft industry, and the like.

It is well known that fluoro-rubber is prepared by curing a fluoroelastomer in the presence of curing agent. The fluoro-rubber is required to have an excellent elastic property as well as a low compression set in the practical uses. In general, however, a fluoro-rubber prepared by curing a conventional composition tends to be inferior in compression set when the elastic property is guaranteed and, on the other hand, tends to reduce its elastic property when compression set is suppressed. Therefore, a fluoroelastomer composition which can be cured to provide a fluoro-rubber having an excellent elastic property in addition to a low compression set is earnestly desired. Also, it is very significant in preparing a fluoro-rubber that a fluoroelastomer composition has an excellent processing property.

OBJECT OF THE INVENTION

It is an object of the present invention to provide a novel fluoroelastomer composition which can be cured to provide a fluoro-rubber having a low compression set and an excellent elastic property.

A further object of the invention is to provide a fluoroelastomer composition having an excellent processing property.

A more further object of the invention is to provide a fluoroelastomer composition capable of being cured with an appropriate induction time and a good cure rate.

A still further object of the invention is to provide a fluoroelastomer composition having excellent storability as an uncured composition.

These and other objects will become apparent from the description hereinafter.

DESCRIPTION OF THE INVENTION

It has now been found that the above-mentioned objects can be attained by the fluoroelastomer composition which comprises (a) a fluoroelastomer, (b) at least one metal compound selected from the group consisting of a bivalent metal oxide, a bivalent metal hydroxide and a mixture of bivalent metal oxide or a metal hydroxide with a metal salt of a weak acid, (c) an aromatic polyhydroxy compound, (d) a quaternary ammonium compound having the general formula:

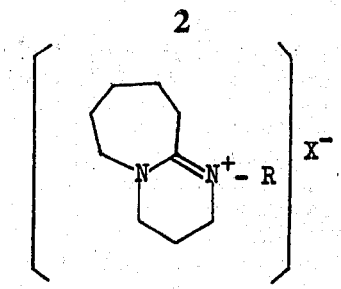

wherein R is an alkyl group having 1 to 24 carbon atoms or an aralkyl group having 7 to 20 carbon atoms, and $x^-$ is an anion selected from the group consisting of halide ion, hydroxylate ion, alkoxylate ion, carboxylate ion, phenoxide ion, sulfonate ion, sulfate ion, sulfite ion and carbonate ion, and (e) 1,8-diaza-bicyclo[5.4.0]-7-undecene in an amount less than that capable of curing the fluoroelastomer. In the present invention, there may be added water or a metal compound which readily produces water by reacting it with hydrogen fluoride. In that case, the composition can be cured without losing various characteristics of the present invention.

By curing the fluoroelastomer composition of the present invention, there can be obtained a fluoro-rubber having excellent elastic properties such as modulus at 100 % elongation, tensile strength, elongation and hardness, and low compression set at room or high temperature. For instance, when the fluoro-rubber of the invention instead of a conventional fluoro-rubber is used as a packing material in oil pressure machines under severe condition, repeated tightening of the packing material is not required to prevent leaks of oil or gas, owing to the excellent properties of the fluoro-rubber of the present invention, particularly low compression set and excellent elastic property.

Further, the fluoroelastomer composition of the invention can be handled and processed with safety, and the composition has an appropriate induction time and a satisfactory good cure rate. For instance, scorching seldom occurs during handling before cure and a complicated article can be readily prepared without any showing of back rind and other inferiorities because of the favorable flowability at the press cure. And yet, the composition of the invention has the advantage of being excellent in storability.

FIG. 1 is a curing curve by Curelasto Meter, for reference, which shows relation between minimum viscosity, extent of cure, induction time, proper curing time and cure rate.

The fluoroelastomer (a) ingredient of the invention, which is a highly fluorinated elastic copolymer, is, for instance, copolymers of vinylidene fluoride and at least one other fluoroolefin such as hexafluoropropene, pentafluoropropene, trifluoroethylene, trifluorochloroethylene, tetrafluoroethylene, vinyl fluoride, perfluoro(methyl vinyl ether), perfluoro(propyl vinyl ether), or the like. Vinylidene fluoride-hexafluoropropene copolymer and vinylidene fluoride-tetrafluoroethylene-hexafluoropropene terpolymer are preferably employed.

In the present invention, the metal compound (b) is employed as an acid acceptor. Suitable examples of (b) ingredient of the invention are bivalent metal oxides such as MgO, CaO, PbO or ZnO, metal hydroxides such as $Mg(OH)_2$, $Ca(OH)_2$, $PB(OH)_2$ or $Zn(OH)_2$, mixtures of the above metal oxides and the above metal hydroxides, and mixtures of the above metal oxides and/or the above metal hydroxides with a metal salt which is formed from metal such as Ba, Na, K, Pb or Ca and weak acid such as stearic acid, benzoic acid, carbonic acid, oxalic acid or phosphorous acid.

In the present invention, the aromatic polyhydroxy compound (c) is employed as a crosslinking agent, Examples of (c) ingredient being aromatic polyhydroxy compounds are 2,2-bis(4-hydroxyphenyl)propane (Bisphenol A), 2,2-bis(4-hydroxyphenyl)perfluoropropane (Bisphenol AF), resorcinol, 1,3,5-trihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (Bisphenol B), 4,4-bis(4-hydroxyphenyl)pentanoic acid, 2,2-bis(4-hydroxyphenyl)tetrafluorodichloropropane, 4,4'-dihydroxydiphenyl sulfone, 4,4'-dihydroxydiphenyl ketone, tri(4-hydroxyphenyl)methane, 3,3',5,5'-tetrachlorobisphenol A, 3,3',5,5'-tetrabromo-bisphenol A, and the like. Hydroquinone, Bisphenol A, Bisphenol B and Bisphenol AF are especially preferred, and alkali metal salts or alkaline earth metal salts of the above-mentioned aromatic polyhydroxy compounds may be also employed.

In the present invention, the quaternary ammonium compound (d) is employed as a vulcanization accelerator in -diaza-bicyclo[with 1,8-diaza-bicyclo[5.4.0]-7-undecene (e). Examples of (d) ingredient being quaternary ammonium compound are 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0]-7-undecenium methylsulfate, 8-ethyl-1,8-diaza-bicyclo[5.4.0]-7-undecenium bromide, 8-propyl-1,8-diaza-bicyclo[5.4.0]-7-undecenium bromide, 8-dodecyl-1,8-diaza-bicyclo[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7-undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenethyl-1,8-diaza-bicyclo[5.4.0]-7-undecenium chloride, 8-(3-phenylpropyl)-1,8 -diaza-bicyclo[5.4.0]-7-undecenium chloride, and the like.

Water can be added directly or in the form of metal salt hydrates into the fluoroelastomer composition. That is to say, there may be employed metal salt hydrates capable of providing water harmlessly under curing condition, such as $MgSO_4 \cdot 7H_2O$, $CuSO_4 \cdot 5H_2O$ and $FeSO_4 \cdot 7H_2O$. As a metal compound which readily produces water by reacting it with hydrogen fluoride, metal hydroxides such as $Mg(OH)_2$, $Pb(OH)_2$ and $Ca(OH)_2$ may be employed. In case of using these metal hydroxides, the addition of (b) ingredient may be omitted.

As the amount of the above ingredients to 100 parts by weight of fluoroelastomer 2 to 30 parts, preferably 5 to 20 parts by weight of (b) ingredient, 0.5 to 5 parts, preferably 1 to 2 parts by weight of (c) ingredient and 0.2 to 10 parts, preferably 0.3 to 1 part by weight of (d) ingredient respectively are suitably employed. The (e) ingredient is employed in an effective amount which is not capable of curing the fluoroelastomer. In general, it is preferable to employ it in an amount of not more than 0.07 part by weight to 100 parts by weight of fluoroelastomer, particularly in an amount of less than about 10 % by weight of (d) ingredient employed. In case (e) ingredient is employed in too large an amount, the elastic properties of the resultant fluoro-rubber are liable to be reduced. The amount of water, when used in the invention, is selected from the range of 0.1 to 10 parts, preferably 0.5 to 5 parts by weight to 100 parts by weight of fluoroelastomer. The amount of the metal compound, when used in the invention, varies according to the kind thereof, and in general it may be 0.5 to 30 parts, preferably 2 to 10 parts by weight to 100 parts by weight of fluoroelastomer.

In the present invention, filler such as carbon black, silica, clay, diatomaceous earth or talc may be further added into the composition of the invention in accordance with necessity. If necessary, a small amount of one or more of conventional curing agents may be added into the composition of thte invention unless the spirit of the present invention is lost. Moreover, plasticizer and colorant also may be added.

Thus obtained fluoroelastomer composition can be cured by a conventional process. For instance, the composition is milled by mixing rolls and the resultant compound is put into a mold and cured under pressure and then the resultant article is removed out of the mold, followed by curing it in an oven. In general, the press cure is carried out at a temperature of 100° to 200°C. under a pressure of 20 to 100 kg./cm.$^2$ for a period of 5 to 180 minutes, and the oven cure is carried out at a temperature of 150° to 300°C. for a period of 0 to 30 hours. Other processes for cure, for instance, a process which the cure is carried out after pre-molding such as injection molding or extrusion molding; alternatively a process which a coating composition prepared by dissolving or dispersing the fluoroelastomer composition into a solvent such as ketones, e.g. methyl ethyl ketone, acetone and cyclohexanone, ethers, e.g. methyl ethyl ether, diethyl ether, dioxane and tetrahydrofuran, or a mixture thereof is applied on a surface of paper, fiber, film, sheet, board, tube, pipe, tank, big vessel or the other shaped articles (made by cellulose derivatives, synthetic resin, metal or the others) and then cured, may be carried out.

The fluoro-rubber obtained from the fluoroelastomer composition of the present invention has advantages such as an excellent heat resistance, an oil resistance, a chemical resistance and weathering resistance, and also the composition of the invention takes effect as mentioned before. Therefore, industrial value and economical value of the present invention are great.

The present invention is more specifically described and explained by means of the following Examples which, however, are not intended to be limited. In Examples, all parts are by weight except as otherwise noted.

EXAMPLE 1

One hundred parts by vinylidene fluoride-hexafluoropropene-tetrafluoroethylene terpolymer copolymerized in the molar ratio of 66.5 : 16.0 : 17.5 (Mooney viscosity: 50ML$_{1+20}$ at 140°C. which was measured in accordance with the provision of Japanese Industrial Standard K 6300), was milled b mixing rolls at a room temperature, while adding medium thermal carbon, magnesium oxide, calcium hydroxide, hydroquinone, 1,8-diaza-bicyclo[5.4.0]-7-undecene and 8-benzyl-1,8-diaza-bicyclo[5.4.0]-7-undecenium chloride with the amount shown in the followinig Table 1, in order, and the resultant compound was allowed to stand over night. After milling again, the composition was put into a mold and cured at a temperature of 170°C. under a pressure of 55 kg./cm.² for a period of 30 minutes to give sheet and block, respectively. The resultant was removed out of the mold and cured at temperature of 230°C. for a period of 24 hours.

Modulus at 100 % elongation, tensile strength, elongation and hardness of the obtained fluoro-rubber sheet and compression set of the obtained fluoro-rubber block were measured. Further, curing test of the composition was carried out at a temperature of 170°C. by using a Curelasto Meter. From the curing curve, minimum viscosity, extent of cure, induction time, proper curing time and cure rate were estimated.

As Comparative Examples 1 and 2, the same procedures as in Example 1 were repeated except that the composition excluding 8-benzyl-1,8-diaza-bicyclo[5.4.0]-7-undecenium chloride and the composition excluding 1,8-diaza-bicyclo[5.4.0]-7-undecene were employed. The amount employed and the results were shown in the following Table 1.

4. Compression set is measured with the test disk samples prepared from the samples of cured block, according to the provision of JIS K 6301, as follows: The test samples are kept at 23°C. and 200°C. under a compression of 25 % for 24 hours, and then allowed to stand at a room temperature for 30 minutes for measurement with a thickness gauge for rubber of Peacock type made by Kabushiki Kaisha Ozaki Seisakusho. Compression set is calculated on the basis of a thickness of sample according to the following equation:

$$\text{Compression set } (\%) = \frac{t_0 - t_1}{t_0 - t_2} \times 100$$

wherein $t_0$ is thickness (mm.) before compression, $t_1$ is thickness (mm.) after compression and $t_2$ is thickness (mm.) of spacer.

In case of Comparative Example 1 in which a small amount of 1,8-diaza-bicyclo[5.4.0]-7-undecene is employed alone as a vulcanization accelerator, there is no Table 1

| | Ingredients | | | | | | |
|---|---|---|---|---|---|---|---|
| | Fluoroelastomer | Medium thermal carbon | Magnesium oxide | Calcium hydroxide | Hydroquinone | 1,8-diaza-bicyclo-[5.4.0]-7-undecene | 8-benzyl-1,8-diaza-bicyclo-[5.4.0]-7-undecenium chloride |
| Ex.1 | 100 | 20 | 10 | 6 | 1.2 | 0.01 | 0.40 |
| Com. Ex.1 | 100 | 20 | 10 | 6 | 1.2 | 0.01 | — |
| Com. Ex.2 | 100 | 20 | 10 | 6 | 1.2 | — | 0.40 |

| | Curing test | | | | | Properties | | | | |
|---|---|---|---|---|---|---|---|---|---|---|
| | Minimum viscosity kg. | Extent of cure kg. | Induction time min. | Proper curing time min. | Cure rate min. | Modulus at 100 % kg./cm.² | Tensile strength kg./cm.² | Elongation % | Hardness | Compression set 23°C × 24 hrs % | 200°C × 24 hrs % |
| Ex.1 | 0.47 | 3.10 | 3.7 | 10.7 | 7.0 | 87 | 167 | 160 | 78 | 10 | 11 |
| Com. Ex.1 | 0.58 | Stress after 30 mins: 0.49 Stress on and after 30 mins: increase of stress is very small | — | — | — | — | — | — | — | — | — |
| Com. Ex.2 | 0.50 | Stress after 10 mins: 0.16 Stress after 20 mins: 1.23 Stress after 30 mins: 2.23 Stress on and after 30 mins: increase of stress is very small | — | — | — | 81 | 194 | 180 | 79 | 13 | 14 |

NOTE

1. Curing test is carried out with the sample (34 mm. X 7 mm. X 2 mm.) by using a curelasto meter (JSR-Curelasto Meter No. II Type). The test sample is put into a mold chamber and tested under the condition of temperature of 170°C., frequency of 6 c./min. and amplitude of 3°. A curing curve is then prepared from the stresses measured with the elapse of time, and therefrom minimum viscosity (kg.), extent of cure (kg.), induction time (min.), proper curing time (min.) and cure rate (min.) are obtained.

2. Modulus at 100 % elongation (kg./cm.²), tensile strength (kg./cm.²) and elongation (%) are measured with dumbbell test pieces (No. 3) prepared from the samples of cured sheet by using a universal tensile tester (UTM-III type) made by Toyo Sokki Kabushiki Kaisha according to the provision of Japanese Industrial Standard K 6301 (corresponds to ASTM D 412-68).

3. Hardness is measured by using a hardness tester (Asker J type) made by Kobunshi Keiki Kabushiki Kaisha.

cure in substance. Also in case of Comparative Example 2 in which 8-benzyl-1,8-diaza-bicyclo[5.4.0]-7-undecenium chloride is employed alone as a vulcanization accelerator, the cure rate is slow compared with Example 1. On the other hand, it is clear that curing is accelerated by employing a quaternary ammonium compound of 8-alkyl- or 8-aralkyl-1,8-diaza-bicyclo[5.4.0]-7-undecenium in combination with 1,8-diaza-bicyclo[5.4.0]-7-undecene, besides the obtained fluoro-rubber is excellent in elastic property and compression set.

EXAMPLES 2 to 4

The same procedures as in Example 1 were repeated except that the compositions shown in the following Table 2 were employed. The results were shown in Table 2. As Comparative Example 3, the same procedure as in Example 1 was repeated except that the composition shown in the following Table 2 in which known hexamethylenediamine carbamate was employed as a curing agent, and press cure and oven cure were respectively carried out at a temperature of 150°C. for a period of 15 minutes and at a temperature of 200°C. for a period of 24 hours, and curing test was carried out at a temperature of 150°C.

clo[5.4.0.]-7-undecenium bromide, 8-propyl-1,8-diaza-bicyclo[5.4.0]-7-undecenium bromide, 8-dode- Table 2

| | Fluoro-elasto-mer | Medium thermal carbon | Magnesium oxide | Calcium hydroxide | Water | Ingredients Hydroquinone | 1,8-diaza-bicyclo-[5.4.0]-7-undecene | 8-benzyl-1,8-diaza-bicyclo[5.4.0]-7-undecenium chloride | Hexamethylenediamine carbamate |
|---|---|---|---|---|---|---|---|---|---|
| Ex. 2 | 100 | 20 | 3 | 6 | — | 1.2 | 0.05 | 0.40 | — |
| Ex. 3 | 100 | 20 | 3 | 6 | — | 1.2 | 0.05 | 0.45 | — |
| Ex. 4 | 100 | 20 | 15 | — | 2.0 | 1.0 | 0.01 | 0.55 | — |
| Com. Ex. 3 | 100 | 20 | 15 | — | — | — | — | — | 1.5 |

| | Curing test | | | | | Properties | | | | Compression set | |
|---|---|---|---|---|---|---|---|---|---|---|---|
| | Minimum viscosity | Extent of cure | Induction time | Proper curing time | Cure rate | Modulus at 100 % | Tensile strength | Elongation | Hardness | 23°C × 24 hrs | 200°C × 24 hrs |
| | kg. | kg. | min. | min. | min. | kg./cm.² | kg./cm.² | % | — | % | % |
| Ex.2 | 0.48 | 3.85 | 5.3 | 11.6 | 6.3 | 82 | 169 | 160 | 75 | 8 | 12 |
| Ex.3 | 0.46 | 4.00 | 3.7 | 7.7 | 4.0 | 118 | 166 | 150 | 77 | 8 | 11 |
| Ex.4 | 0.80 | 5.66 | 1.6 | 13.5 | 11.9 | 93 | 190 | 170 | 79 | — | — |
| Com. Ex.3 | 0.68 | 2.82 | 1.8 | 14.8 | 13.0 | 58 | 194 | 200 | 74 | 23 | 34 | what is claimed is:

1. A fluoroelastomer composition comprising per 100 parts by weight of (a) a fluoroelastomer, 2 to 30 parts by weight of (b) at least one metal compound selected from the group consisting of a bivalent metal oxide, a bivalent metal hydroxide and a mixture of a bivalent metal oxide or a metal hydroxide with a metal salt of a weak acid, 0.5 to 5 parts by weight of (c) an aromatic polyhydroxy compound, 0.2 to 10 parts by weight of (d) a quaternary ammonium compound having the general formula:

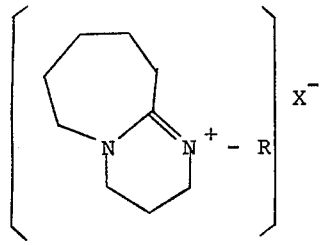

wherein R is an alkyl group having 1 to 24 carbon atoms or an aralkyl group having 7 to 20 carbon atoms, and x⁻ is an anion selected from the group consisting of halide ion, hydroxylate ion, alkoxylate ion, carboxylate ion, phenoxide ion, sulfonate ion, sulfate ion, sulfite ion and carbonate ion, and an effective amount but not more than 0.07 part by weight of (e) 1,8-diaza-bicyclo[5.4.0]-7-undecene.

2. The composition of claim 1, wherein said quaternary ammonium compound (d) is present in an amount of 0.3 to 1 part by weight to 100 parts by weight of a fluoroelastomer.

3. The composition of claim 1, wherein said quaternary ammonium compound (d) is at least one member selected from the group consisting of 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0]-7-undecenium methylsulfate, 8-ethyl-1,8-diaza-bicyclo[5.4.0.]-7-undecenium bromide, 8-propyl-1,8-diaza-bicyclo[5.4.0]-7-undecenium bromide, 8-dodecyl-1,8-diaza-bicyclo[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7-undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenethyl-1,8-diaza-bicyclo[5.4.0]-7-undecenium chloride and 8-(3-phenylpropyl)-1,8-diaza-bicyclo[5.4.0]-7-undecenium chloride.

4. The composition of claim 1, wherein said 1,8-diaza-bicyclo[5.4.0]-7-undecene (e) is present in an amount of less than about 10 % by weight of the quaternary ammonium compound (d).

5. The composition of claim 1, wherein said metal compound (b) is present in an amount of 5 to 20 parts by weight to 100 parts by weight of a fluoroelastomer.

6. The composition of claim 1, wherein said aromatic polyhydroxy compound (c) is present in an amount of 1 to 2 parts by weight to 100 parts by weight of a fluoroelastomer.

7. The composition of claim 1, wherein said aromatic polyhydroxy compound (c) is hydroquinone, Bisphenol A, Bisphenol B or Bisphenol AF.

8. The composition of claim 1, wherein said fluoroelastomer (a) is a copolymer of vinylidene fluoride and at least one other fluoro-olefin.

9. The composition of claim 8, wherein said fluoro-olefin is hexafluoropropene, pentafluoropropene, trifluoroethylene, trifluorochloroethylene, tetrafluoroethylene, vinyl fluoride, perfluoro(methyl vinyl ether) or perfluoro(propyl vinyl ether).

10. The composition of claim 1, wherein said fluoroelastomer (a) is a copolymer of vinylidene fluoride and hexafluoropropene.

11. The composition of claim 1, wherein said fluoroelastomer (a) is a terpolymer of vinylidene fluoride, tetrafluoroethylene and hexafluoropropene.

12. A process for preparing fluoro-rubber which comprises milling a fluoroelastomer composition comprising per 100 parts by weight of (a) a fluoroelastomer, 2 to 30 parts by weight of (b) at least one metal compound selected from the group consisting of a bivalent metal oxide, a bivalent metal hydroxide and a mixture of a bivalent metal oxide or a metal hydroxide with a metal salt of a weak acid, 0.5 to 5 parts by weight of (c) an aromatic polyhydroxy compound, 0.2 to 10 parts by weight of (d) a quaternary ammonium compound having the general formula:

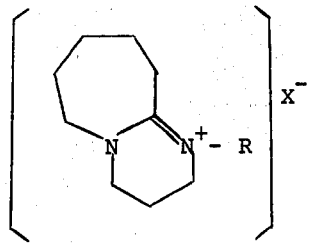

wherein R is an alkyl group having 1 to 24 carbon atoms or an aralkyl group having 7 to 20 carbon atoms, and x⁻ is an anion selected from the group consisting of halide ion, hydroxylate ion, alkoxylate ion, carboxylate ion, phenoxide ion, sulfonate ion, sulfate ion, sulfite ion and carbonate ion, and an effective amount but not more than 0.07 part by weight of (e) 1,8-diaza-bicyclo[5.4.0]-7-undecene, transferring the milled composition to a mold, curing the milled composition at a temperature of 100° to 200°C. under a pressure of 20 to 100 kg./cm.² for a period of 5 to 180 minutes, removing the composition from the mold and continuing to cure at a temperature of 150° to 300°C. for a period of 0 to 30 hours in an oven.

13. A fluoro-rubber obtained by curing the fluoroelastomer composition of claim 1.

* * * * *